United States Patent

Ehret et al.

[11] 4,021,707
[45] May 3, 1977

[54] COMPENSATED PROBE FOR CAPACITIVE LEVEL MEASUREMENT

[75] Inventors: Rudolf Ehret, Schwetzingen; Gerhard Hoyer, Oftersheim, both of Germany

[73] Assignee: Pfaudler-werke AG, Germany

[22] Filed: Oct. 6, 1975

[21] Appl. No.: 619,844

[30] Foreign Application Priority Data

Oct. 15, 1974   Germany ........................ 2449097

[52] U.S. Cl. .............................. 361/284; 73/304 C
[51] Int. Cl.² ........................................ H01G 7/00
[58] Field of Search ............... 73/304 C; 317/246; 324/61 P

[56] References Cited

UNITED STATES PATENTS

| | | | |
|---|---|---|---|
| 2,864,981 | 12/1958 | De Giers | 317/246 |
| 2,950,426 | 8/1960 | Frome | 317/260 |
| 3,119,266 | 1/1964 | Atkinson | 73/304 C |
| 3,400,331 | 9/1968 | Harris | 317/246 X |
| 3,826,980 | 7/1974 | Deichelmann | 317/246 X |
| 3,935,740 | 2/1976 | Whitney | 73/304 C |

Primary Examiner—E. A. Goldberg
Attorney, Agent, or Firm—Theodore B. Roessel; J. Stephen Yeo

[57] ABSTRACT

A capacitive probe for measuring fluid level has two electrodes, each of which forms a capacitor with a supporting conductive body. The first electrode is a vertical band which will yield a capacitive value dependent upon the dielectric constant, conductivity, as well as level of the fluid. The bulk of the second electrode is arranged at the lower end of the supporting body totally immersed in the liquid, and will yield a capacitance based on the dielectric constant and conductivity of the liquid, but substantially not the level of the liquid. A value indicating the liquid level independent of dielectric constant and conductivity may be obtained from the two capacitive values of the electrodes.

4 Claims, 4 Drawing Figures

COMPENSATED PROBE FOR CAPACITIVE LEVEL MEASUREMENT

BACKGROUND OF THE INVENTION

The present invention relates to a probe with electrodes for the capacitive measurement of liquid levels in a container.

Probes for level measurements according to prior art often rod-shaped and are arranged in the container so that a capacitor is formed between the probe and container wall. The capacitive value obtained is ideally a measure of the level in the container. In the case of such probes it is considered a drawback that a linear relationship between level and indication exists usually only the case of cylindrical geometry and that on account of the dependence of level measurement on the dielectric constant of the liquid. Because the level measurement is definite only in the case of a definite dielectric, errors may result during level measurement. Furthermore, the probe may not be arranged at arbitrarily great distances from the container wall, since for the purpose of exact level measurement the capacity variation along the length of the probe must be as great as possible. Furthermore, the desired linearity of level indication is obtained only when the probe is parallel with the container wall and existing built-in structures in the container.

A copending U.S. application by John B. Whitney, Ser. No. 481,127, filed June 20, 1974 issued as U.S. Pat. 3,935,740 on Feb. 3, 1976 for Liquid Level Probe describes a capacitor probe having a conductor strip running along the length of an enameled member. The measured quantity is the capacitance between the probe and the conductive tank in which it is mounted.

It is an object of the present invention to provide a probe having characteristics so that the capacitive level measurement may be carried out independently from the dielectric constant and conductivity of the liquid.

SUMMARY OF THE INVENTION

A capacitive probe for measuring fluid level has two electrodes, each of which forms a capacitor with a rod-shaped conductive body. The first electrode is arranged along the length of the body while the bulk of the second electrode is arranged at the lower end of the body. Provision is made to electrically insulate each element from the others.

The lower end of the second electrode may be in the form of a cone structure arranged at the bottom of the rod-shaped body or a spiral wound about the lower end of the body.

The upper end of the second electrode may be arranged along the remaining portion of the body.

DETAILED DESCRIPTION OF THE INVENTION

Our invention provides a capacitive probe for measuring fluid level having two electrodes, each of which forms a capacitor with a supporting conductive body. The first electrode may be a vertical band which will yield a capacitor value dependent upon the dielectric constant, conductivity, as well as level of the fluid. The bulk of the second electrode is arranged at the lower end of the supporting body, and will yield a capacitance based on the dielectric constant and conductivity of the liquid but substantially not the level of the liquid. A value indicating liquid level independent of dielectric constant and inductivity may be obtained from the capacitive values of the electrodes. A number of embodiments are possible using the concept, four of which are set forth hereafter as the best modes known.

Figure 1:
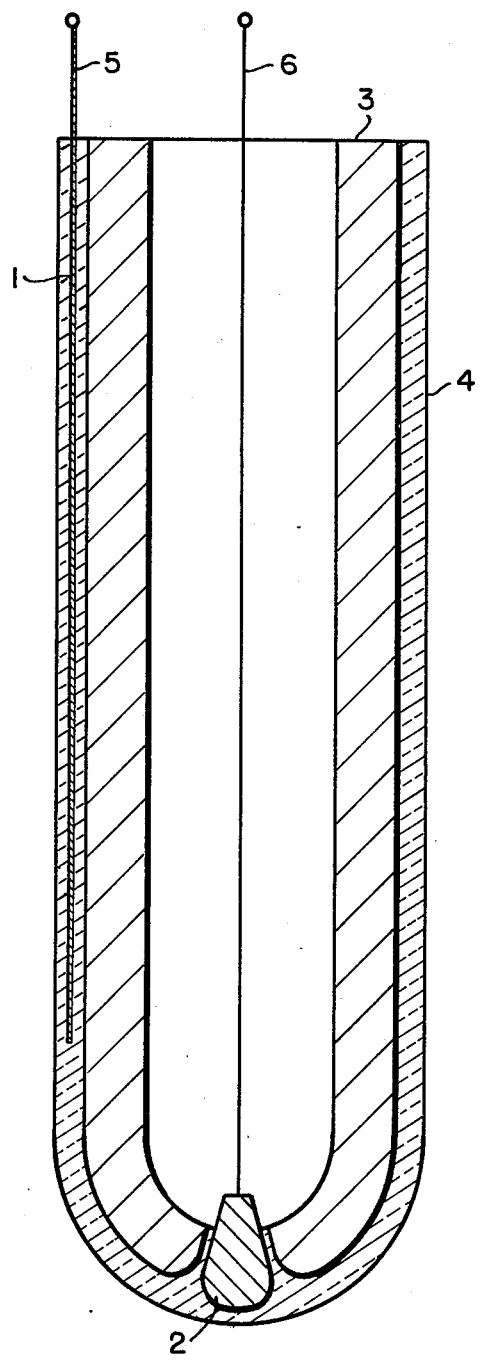
FIGS. 1–4 are longitudinal sections through different embodiment examples of a probe according to the present invention.

In the embodiment represented in FIG. 1 a first electrode 1 is embedded in an enamel layer 4 upon a rod-shaped body 3 preferably constructed of steel. The first electrode 1 preferably consists of a platinum band and runs along the full length of the probe. A second electrode 2 is embedded at the lower end of the probe into enamel layer 4 and includes a metal cone which juts into an opening at the lower end of steel body 3. It is electrically insulated from the steel body by the enamel layer. The connection of electrodes 1 and 2 to known capacitance measurement circuitry (not shown) may be made the associated leads 5, 6.

Figure 2:
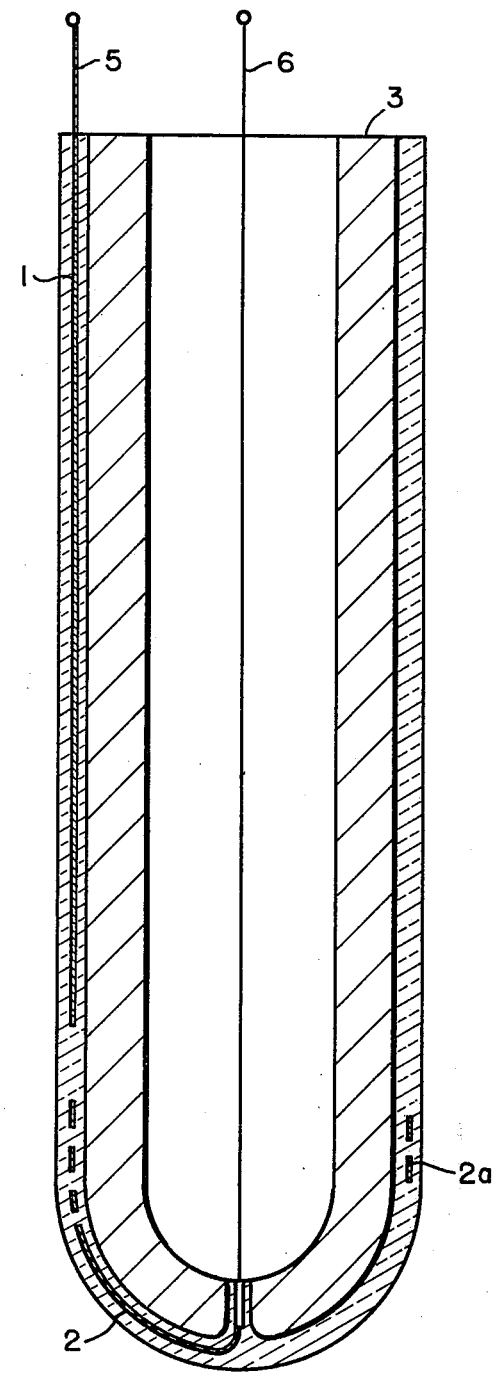

In the case of the embodiment example represented in FIG. 2 the second electrode 2 is also in the form of a band and is embedded into the enamel layer in an opening at the lower end of the steel body. The part of the second electrode embedded into the enamel layer in an opening at the lower end of the steel body. The lower end of the second electrode is embedded into the enamel layer at the lower end of the steel body and may be in the form of spiral 2a.

Figures 3, 4:
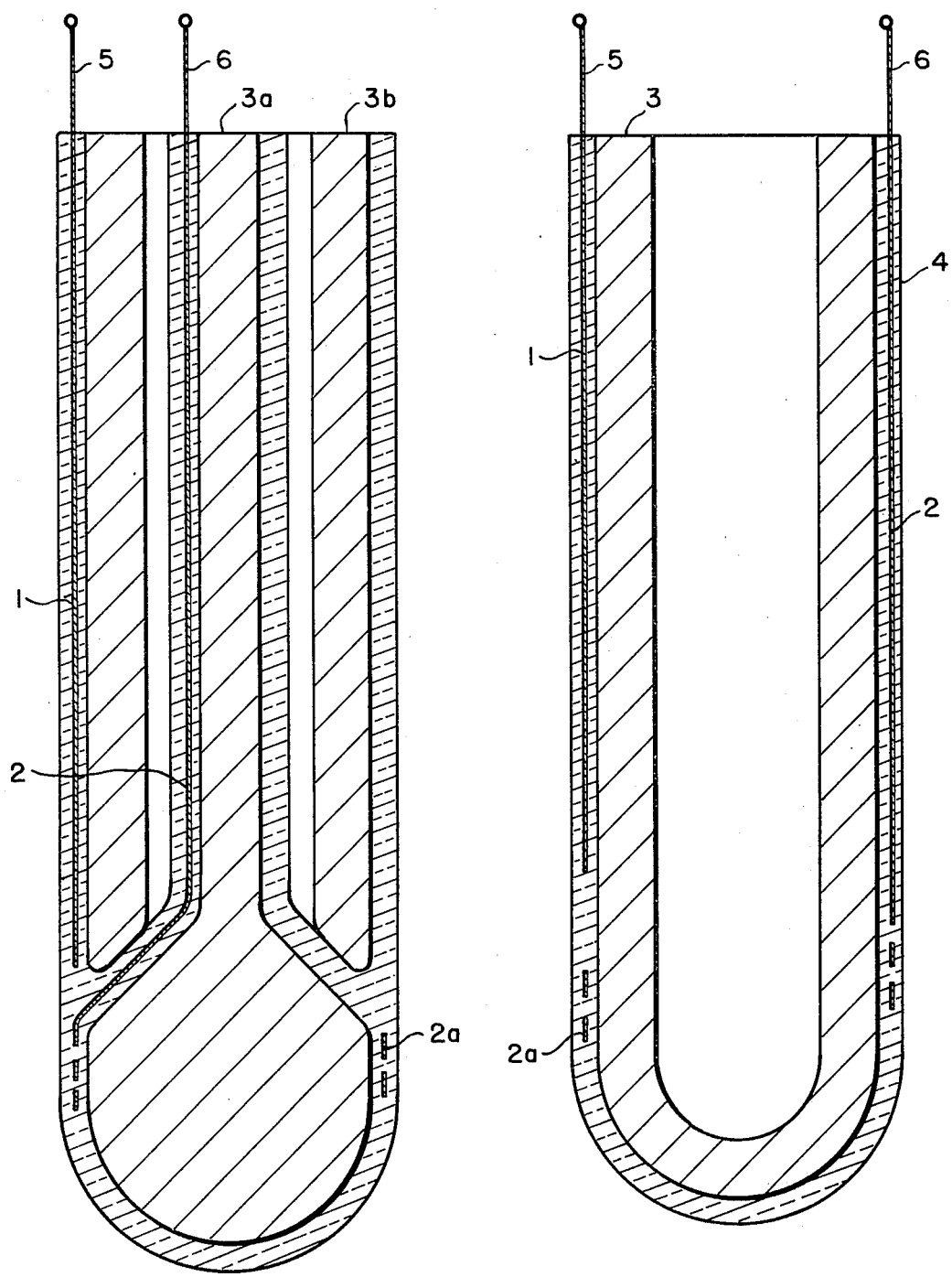

In the case of embodiment example represented on FIG. 3 the rod-shaped probe body has two steel parts 3a and 3b positioned concentrically with each other and fused together at the lower end of the probe by an enamel layer. The second and preferably band-shaped electrode 2 is embedded into the enamel layer inside the steel body and lead through the enamel connecting zone to the external surface of the probe where it ends either after a brief axially parallel course of spiral 2a.

The embodiment example represented in FIG. 4 differs from the embodiments represented in FIGS. 1–3 in that the upper part of the second electrode 2 is also embedded into the enamel layer 4 along the remaining length of the steel body 3.

The operation and use of the probes will now be described in detail. Unlike the probes of the prior art which form a capacitor with the container wall, in the instant case the capacitance of each of of the two embedded electrodes and the body of the probe is utilized. With the instant probe it is now possible to position the probe at arbitrarily great distances from the container wall of, for example, an enameled steel container or a plastic container. The effective capacitance of each electrode referenced to the metal mass of the steel body is determined by the lines of force some of which in the course of their path from the electrode to the conductive mass of the body pass through a stretch of liquid within the container.

The different embodiments of the probe may respond in different ways to the level. With the help of known electrical systems a difference measurement or quotient formation can take place in order to eliminate the influence of variable dielectric constants and/variable conductivity of the liquid on the level measurement. The conductivity of a liquid does not actually affect capacitance but does contribute to errors in measuring the true value.

In the case of a probe according to the embodiments represented on FIGS. 1–3 the lower end of second electrode 2 will upon total immersion into the liquid gives rise to a capacitance which will practically not change even upon further increase of the level and which is a direct measure of the dielectric constant and the conductivity of the liquid. This is because the upper portion of the second electrode is internal to the probe and cannot sense liquid level. The first electrode will yield a capacitance that represents liquid level as well as dielectrical constant and conductivity. By using a known appropriate electrical system, a compensation of the level indication may take place, so that the level indication is independent from the dielectric constant and the conductivity of the liquid.

On the other hand, in the case of the embodiment represented in FIG. 4 the effective capacity between the second electrode 2 and the metal mass of the steel body 3 depends on the liquid level as well as the dielectric constant. Nevertheless, due to the different lengths of the two electrodes 1 and 2, the influence of the dielectric constant and the conductivity on the level measurement may be compensated for. This is because the lower end of the second electrode 2, including sprial 2a which serves for the desired compensation, also acts as a downward extended level electrode which, at the zero point of the shorter first electrode 1, has a capacitive value corresponding to the length of the spiral. Accordingly, as the level varies, the capacitive value variations of the two electrodes will run parallel. Consequently, the difference of the two capacitive values is independent from the level but dependent on the dielectric constant and the conductivity. Variations of the dielectric constant and conductivity bring about a variation in the steepness of the level indication. The difference between the two electrode values is a measure of the dielectric constant and conductivity, and can be used for the automatic compensation of the influence of these parameters on the level measurement.

Having described the preferred embodiments of our invention, we claim:

1. A probe for the capacitive level measurement of a liquid in a container, said probe being comprised of:
    a rod-shaped conductive body for substantially vertical mounting with said container;
    a first electrode embedded in insulation along the length of said rod shaped body,
    a second electrode, at least a portion of which is at the lower end of said rod-shaped body below said first electrode; and
    insulating means for electrically insulating said electrodes from said rod-shaped body so that each electrode forms a capacitor with said rod-shaped body.

2. A probe according to claim 1 wherein the second electrode includes a metal cone arranged into an opening at the lower end of the rod shaped body.

3. A probe according to claim 1 wherein said second electrode has an upper end and a lower end, the lower end of said second electrode is band shaped and is in the form of a spiral.

4. A probe according to claim 3 wherein the upper part of the second electrode extends along the upper length of the rod-shaped body.

* * * * *